United States Patent
Park et al.

(10) Patent No.: US 9,851,835 B2
(45) Date of Patent: Dec. 26, 2017

(54) IMAGE DISPLAY SYSTEM (71) Applicant: Samsung Display Co., Ltd., Yongin, Gyeonggi-Do (KR)

(72) Inventors: Mun-San Park, Yongin (KR); Weon-Jun Choe, Yongin (KR); Myeong-Su Kim, Yongin (KR); Kee-Hyun Nam, Yongin (KR); Jae-Wan Park, Yongin (KR); Jung-Hyun Baik, Yongin (KR); Bong-Hyun You, Yongin (KR)

(73) Assignee: Samsung Display Co., Ltd. (KR)

( * ) Notice: Subject to any disclaimer, the term of this patent is extended or adjusted under 35 U.S.C. 154(b) by 92 days.

(21) Appl. No.: 14/615,351

(22) Filed: Feb. 5, 2015

(65) Prior Publication Data
US 2015/0301678 A1 Oct. 22, 2015

(30) Foreign Application Priority Data

Apr. 21, 2014 (KR) ........................ 10-2014-0047628

(51) Int. Cl.
| | |
|---|---|
| *G06F 3/041* | (2006.01) |
| *G09G 5/377* | (2006.01) |
| *G06T 1/20* | (2006.01) |
| *G09G 5/00* | (2006.01) |
| *G06F 3/0488* | (2013.01) |
| *G09G 5/36* | (2006.01) |
| *G09G 5/08* | (2006.01) |
| *G09G 5/397* | (2006.01) |

(52) U.S. Cl.
CPC .......... *G06F 3/0416* (2013.01); *G06F 3/0488* (2013.01); *G06T 1/20* (2013.01); *G09G 5/36* (2013.01); *G09G 5/08* (2013.01); *G09G 5/397* (2013.01); *G09G 2340/10* (2013.01); *G09G 2340/12* (2013.01); *G09G 2340/125* (2013.01); *G09G 2354/00* (2013.01); *G09G 2360/10* (2013.01)

(58) Field of Classification Search
CPC ....... G06F 3/0416; G06F 3/0488; G09G 5/36; G09G 2340/12; G09G 5/397; G09G 5/08; G09G 2360/10; G09G 2354/00; G09G 2340/10; G09G 2340/125; G06T 1/20
See application file for complete search history.

(56) References Cited

U.S. PATENT DOCUMENTS

| | | | | |
|---|---|---|---|---|
| 9,229,567 | B2 * | 1/2016 | Parekh | ................... G06F 3/0416 |
| 2003/0169262 | A1 * | 9/2003 | Lavelle | ................... G09G 5/363 |
| | | | | 345/531 |
| 2006/0236342 | A1 * | 10/2006 | Kunkel | ............. H04N 5/44543 |
| | | | | 725/52 |

(Continued)

Primary Examiner — Andrew Sasinowski
(74) Attorney, Agent, or Firm — Innovation Counsel LLP (57) ABSTRACT

An image display system is provided. The image display system includes a host, and a touch controller configured to generate touch event information corresponding to a touch signal and supply the touch event information to an accelerator, wherein the touch signal is output from a touch panel. The accelerator is configured to generate, based on the touch event information supplied from the touch controller, output image data corresponding to a touch event. The image display system further includes a display controller configured to supply the output image data generated by the accelerator to a display panel.

29 Claims, 6 Drawing Sheets

(56) References Cited

U.S. PATENT DOCUMENTS

| | | | |
|---|---|---|---|
| 2007/0006287 A1* | 1/2007 | Noda | H04L 63/08 726/4 |
| 2007/0222861 A1* | 9/2007 | Enami | G09G 3/2003 348/196 |
| 2010/0066692 A1* | 3/2010 | Noguchi | G06F 3/0412 345/173 |
| 2010/0079394 A1* | 4/2010 | Tanaka | G06F 3/0412 345/173 |
| 2010/0277505 A1* | 11/2010 | Ludden | G06F 3/0416 345/634 |
| 2011/0161620 A1* | 6/2011 | Kaminski | G06F 12/1009 711/207 |
| 2011/0310118 A1* | 12/2011 | Asmi | G06F 3/04883 345/619 |
| 2012/0044150 A1* | 2/2012 | Karpin | G06F 3/0416 345/173 |
| 2012/0105448 A1* | 5/2012 | Kim | H04N 13/007 345/419 |
| 2013/0201112 A1* | 8/2013 | Large | G06F 3/04883 345/173 |
| 2014/0245194 A1* | 8/2014 | Wright | G06F 9/4445 715/761 |
| 2014/0313144 A1* | 10/2014 | Seto | G06F 3/041 345/173 |
| 2015/0012868 A1* | 1/2015 | Xiong | G06F 3/04886 715/773 |

* cited by examiner

IMAGE DISPLAY SYSTEM

CROSS-REFERENCE TO RELATED APPLICATION

This application claims priority to and the benefit of Korean Patent Application No. 10-2014-0047628 filed on Apr. 21, 2014 in the Korean Intellectual Property Office, the entire contents of which are incorporated herein by reference in their entirety.

BACKGROUND

1. Field

Embodiments of the inventive concept relate to an image display system.

2. Description of the Related Art

In recent years, to improve interaction with users, a touch function is added to image display systems such as mobile phones, tablets, laptop computers, desktop computers, televisions, and the like.

Figure 1:
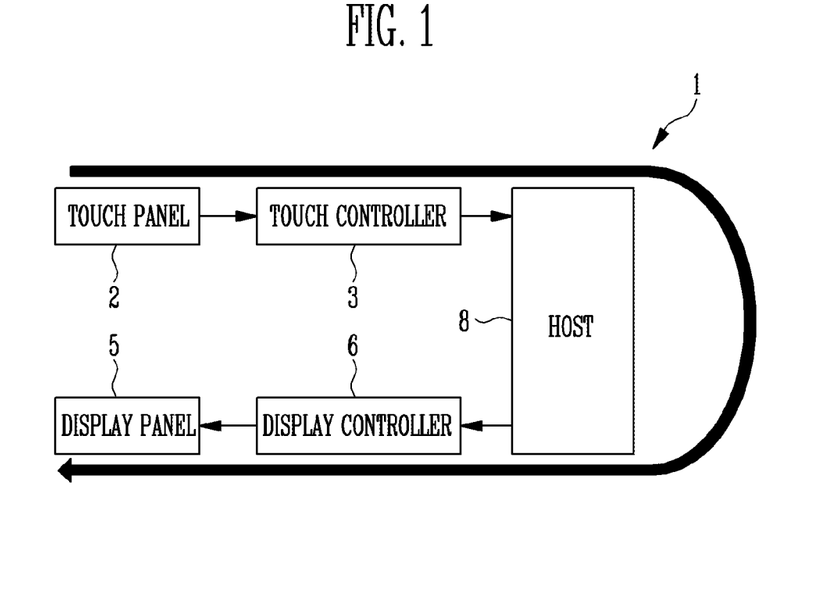
FIG. 1 illustrates a conventional image display system.

For example, referring to FIG. 1, a conventional image display system 1 may include a touch panel 2, a touch controller 3, a display panel 5, a display controller 6, and a host 8.

When a predetermined image is displayed on the display panel 5, a user can provide a desired input by touching a screen of the display panel 5 using a stylus or a part of the user's body such as a finger.

The touch controller 3 detects a touch event occurring at the touch panel 2 and supplies information relating to the detected touch event to the host 8.

The host 8 can render and output a predetermined image corresponding to the touch event to the display controller 6 based on the information received from the touch controller 3. The display controller 6 can provide the image supplied from the host 8 to the user through the display panel 5.

As described above, a response process corresponding to the touch event is achieved through the host 8. As a result, depending on a state of the host 8 (e.g., increase in load on the host 8 due to other tasks, etc.), a response corresponding to the touch event may be delayed.

When the response corresponding to the touch event is delayed, a user may be dissatisfied since responsive feedback to a touch input by the user cannot be promptly provided.

SUMMARY

According to an embodiment of the inventive concept, an image display system includes a host, a touch controller configured to generate touch event information corresponding to a touch signal and supply the touch event information to an accelerator, wherein the touch signal is output from a touch panel. The accelerator is configured to generate, based on the touch event information supplied from the touch controller, output image data corresponding to a touch event. The image display system further includes a display controller configured to supply the output image data generated by the accelerator to a display panel.

In one embodiment, the accelerator may be separate from the host, the touch panel, the touch controller, the display panel, and the display controller.

In one embodiment, the accelerator may be included in the display controller.

In one embodiment, the accelerator may be included in the touch controller.

In one embodiment, the accelerator may be included in the host.

In one embodiment, the touch controller and the accelerator may be included in the display controller.

In one embodiment, the accelerator may include a mask generating logic configured to receive the touch event information and generate mask data based on the touch event information, and a rendering logic configured to generate the output image data by combining video image data and overlay data according to the mask data.

In one embodiment, the accelerator may further include an overlay buffer configured to store the overlay data.

In one embodiment, the mask generating logic may be configured to calculate an estimated touch path according to the touch event information and generate the mask data according to the estimated touch path.

In one embodiment, the mask data may include a plurality of values having positions corresponding to pixels in the output image data.

In one embodiment, the rendering logic may be configured to combine the video image data with the overlay data by determining, for each pixel in the output image data, whether to output a corresponding pixel of the video image data or the overlay data according to a value in a corresponding position in the mask data.

In one embodiment, the rendering logic may be configured to combine the video image data with the overlay data by blending, for each pixel in the output image data, a corresponding pixel of the video image data and the overlay data according to a value in a corresponding position in the mask data.

In one embodiment, the values of the mask data may correspond respectively to the pixels in the output image data.

In one embodiment, each of the values of the mask data may correspond to at least one pixel in the output image data.

In one embodiment, the touch panel may be configured to supply the touch signal to the touch controller, and the touch controller may be configured to generate the touch event information using the touch signal supplied from the touch panel.

In one embodiment, the touch panel may include a capacitive touch panel, a resistive touch panel, an optical touch panel, a surface acoustic wave touch panel, a pressure sensitive touch panel, or a hybrid touch panel.

In one embodiment, the host may be configured to generate the video image data.

In one embodiment, the overlay data may have a same color as the video image data.

In one embodiment, the overlay data may include a plurality of pages.

In one embodiment, the mask data may include information for identifying at least one of the plurality of pages included in the overlay data.

In one embodiment, the overlay data may include a bitmapped image.

In one embodiment, the overlay data may have a single color value.

In one embodiment, the overlay buffer may be configured to store the overlay data supplied from the host.

In one embodiment, the touch event information may include first touch event information corresponding to a touch event generated during an n-th period and second touch event information corresponding to a touch event generated during a (n+1)-th period.

In one embodiment, the touch controller may be configured to supply the touch event information to the host.

In one embodiment, the mask generating logic may be configured to generate the mask data based on the second touch event information. The host may be configured to generate the video image data based on the first touch event information.

In one embodiment, the host may include a central processing unit and a graphic processing unit.

In one embodiment, the central processing unit may be configured to supply the overlay data to the accelerator, and the graphic processing unit may be configured to supply the video image data to the accelerator.

In one embodiment, the output image data may be the overlay data combined with the video image data supplied from the host.

BRIEF DESCRIPTION OF THE DRAWINGS

Example embodiments will now be described more fully herein with reference to the accompanying drawings; however, the inventive concept may be embodied in different forms and is not limited to the embodiments set forth herein. Rather, these embodiments are provided so that this disclosure is thorough and complete, and fully convey the scope of the inventive concept to those skilled in the art.

In the figures, dimensions may be exaggerated for clarity. It will be understood that when an element is referred to as being "between" two elements, it may be the only element between the two elements, or one or more intervening elements may be present. Like reference numerals refer to like elements throughout.

DETAILED DESCRIPTION

Delay or lag in a user interface (UI) is a common cause for user dissatisfaction with image display systems.

For example, current mobile phones may take anywhere from 50 to 200 milliseconds (ms) to update the display in response to a touch action by the user.

For example, the typical display response time to a touch event as measured on a Samsung® Galaxy Note®2 phone may be more than 100 ms, which corresponds to approximately at least 6 frames of video images based on a refresh rate of 60 frames per second (FPS) and are observable by most users.

For example, when the user draws a certain pattern (consisting of a line, for example) on the screen of a display panel using a stylus, there may be a gap between the last portion of the displayed pattern and the tip of the stylus. A user may notice the gap caused by the display lag.

To reduce the gap and the display lag, embodiments of the inventive concept can overlay an image in touch paths in advance of the image rendered by a host (e.g., application processor) so that the user can detect a more rapid touch response.

By closing the gap between the user's touch (regardless whether a finger, stylus, or other tool is being used) and the drawing displayed on the display panel, the display lag can be decreased.

As used herein, the word "overlay" when used as a verb may refer to replacing (or "overlaying") some of the original video images with additional image data by combining the video images (e.g., host rendered images) and additional image data. Also, when the word "overlay" is used as a noun, it may refer to the appearance of the additional image data from the combined image.

In addition, by using an overlay method, application software can be used to control the region (e.g., location on the display), color, and rendering operation of the display response.

Figure 2:
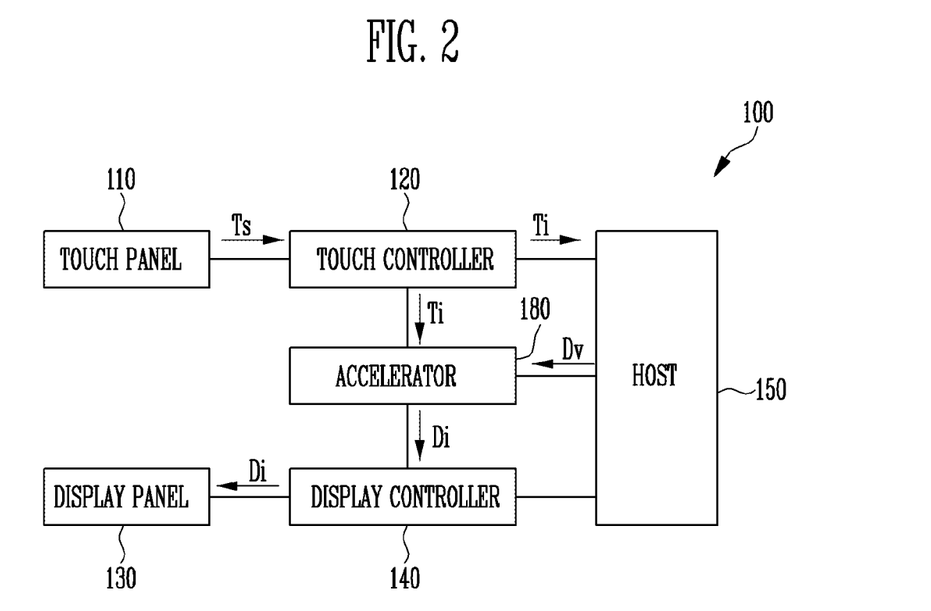
FIG. 2 illustrates an image display system according to a first embodiment.
Figure 3:
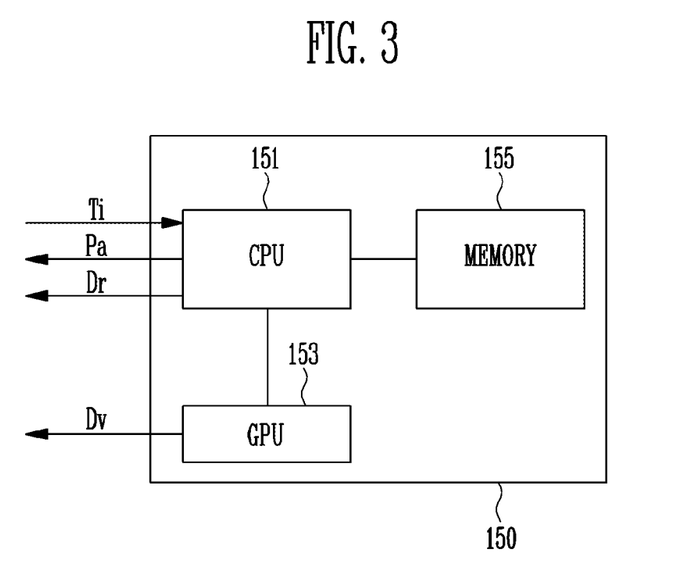
FIG. 3 illustrates a host according to an embodiment.

FIG. 2 illustrates an image display system according to a first embodiment. FIG. 3 illustrates a host according to an embodiment.

Referring to FIG. 2, the image display system 100 according to the first embodiment may include a touch panel 110, a touch controller 120, a display panel 130, a display controller 140, a host 150, and an accelerator 180.

The touch panel 110 may be configured to detect touch by the user and generate a touch signal Ts that is supplied to the touch controller 120. The touch panel 110 may be connected to the touch controller 120.

The touch panel 110 may be configured to detect the user's touch using a pointing implement such as a part of the user's body (e.g., finger), stylus, etc.

The "pointing implement" as used herein may refer to objects which can be detected by the touch panel 110. The "pointing implement" may include devices such as a stylus or parts of a body such as fingers.

For example, the touch panel 110 may include any one of a capacitive type touch panel, a resistive type touch panel, an optical touch panel, a surface acoustic wave touch panel, a pressure touch panel, and a hybrid touch panel.

A hybrid touch panel may be constructed by combining the same type of touch panels or different types of touch panels.

However, the touch panel 110 is not limited to the panel types described above. For example, the touch panel 110 may include any type of panel that can be configured to detect a touch by a pointing implement.

The touch signal Ts that is output from the touch panel 110 may correspond to estimated values of capacitance, voltage or current for each position on the touch panel 110.

The touch controller 120 may generate information Ti relating to a touch event generated at the touch panel 110. The touch event information Ti may be generated using the touch signal Ts supplied from the touch panel 110.

The touch controller 120 may supply the generated touch event information Ti to the accelerator 180.

The touch controller 120 may supply the touch event information Ti to both the accelerator 180 and the host 150 concurrently. The touch controller 120 may be coupled to the accelerator 180 and the host 150.

The touch event information Ti may be data corresponding to a position where the touch event occurs (e.g., as defined by a set of coordinates) by the user. In other embodiments, the touch event information Ti may further include input data corresponding to pressure applied to the touch panel 110.

The host 150 may receive the touch event information Ti supplied from the touch controller 120 and generate video image data Dv based on the touch event information Ti. The host 150 may supply the generated video image data Dv to the accelerator 180.

The host 150 may also display images that are unrelated to touch on the display panel 130, by supplying general image data unrelated to touch events to the display controller 140.

To this end, the host 150 may be coupled to the accelerator 180 and the display controller 140.

Referring to FIG. 3, the host 150 according to an embodiment may include a central processing unit (CPU) 151 and a graphic processing unit (GPU) 153. The host 150 may further include a memory 155 in addition to the CPU 151 and GPU 153.

The CPU 151 may receive the touch event information Ti and control the GPU 153. The GPU 153 may generate the video image data Dv corresponding to the touch event.

The GPU 153 may supply the generated video image data Dv to the accelerator 180.

The host 150 may supply overlay data Dr and/or parameter Pa to the accelerator 180.

For example, the CPU 151 included in the host 150 may supply the overlay data Dr and/or the parameter Pa to the accelerator 180.

The display controller 140 may be configured to control driving of the display panel 130. That is, to display a predetermined image on the display panel 130, the image data supplied from an external device may be supplied to the display panel 130 by synchronizing to a certain timing.

For example, the display controller 140 may receive output image data Di generated by the accelerator 180 and supply the output image data Di to the display panel 130 by synchronizing it to a predetermined control signal.

The display controller 140 may receive general image data separate from the output image data Di from the host 150 and supply the general image data to the display panel 130 by synchronizing it to a predetermined control signal.

The display panel 130 may display a predetermined image corresponding to the type of image data supplied from the display controller 140.

For example, the display panel 130 may display an image corresponding to the output image data Di supplied from the accelerator 180 through the display controller 140.

The display panel 130 may also display an image corresponding to general image data supplied from the host 150 through the display controller 140.

The display panel 130 may be implemented as a liquid crystal display, a plasma display panel, an organic light emitting display panel, etc.

The display panel 130 according to an embodiment may include a plurality of pixels (not shown) configured to display a certain image, a scan driver (not shown) configured to supply scan signals to the pixels, and a data driver configured to supply data signals corresponding to image data supplied from the display controller 140 to the pixels.

The accelerator 180 may receive the touch event information Ti from the touch controller 120 and generate output image data Di relating to the touch event generated at the display panel 130. The output image data Di may be generated based on the touch event information Ti.

The accelerator 180 may output the generated output image data Di to the display controller 140.

The accelerator 180 may process the touch event information Ti as output image data Di so that visual response with respect to the touch event may be implemented more rapidly.

Figure 4:
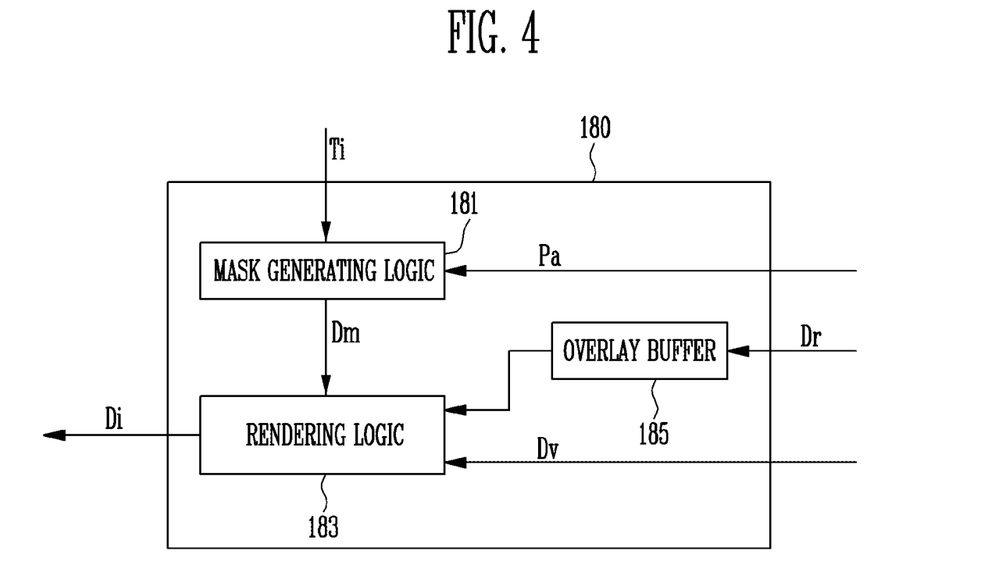
FIG. 4 illustrates an accelerator according to an embodiment.

FIG. 4 illustrates an accelerator according to an embodiment.

Referring to FIG. 4, the accelerator 180 according to an embodiment may include a mask generating logic 181 and a rendering logic 183.

The mask generating logic 181 may receive the touch event information Ti from the touch controller 120 and generate mask data Dm based on the touch event information Ti.

For example, the mask generating logic 181 may calculate an estimated touch path Pe (refer to FIG. 5) according to the touch event information Ti and generate the mask data Dm according to the estimated touch path Pe.

The rendering logic 183 may generate the output image data Di by combining the video image data Dv and the overlay data Dr according to the mask data Dm transferred from the mask generating logic 181.

The rendering logic 183 may output the generated output image data Di to the display controller 140.

The video image data Dv may be supplied from the host 150. For example, the GPU 153 included in the host 150 may supply the video image data Dv to the rendering logic 183.

The overlay data Dr may be supplied from the host 150. However, embodiments are not limited thereto.

For example, in an embodiment, the overlay data Dr may be generated in the accelerator 180.

In another embodiment, the overlay data Dr may be a combination of data generated in the accelerator 180 and the data supplied from the host 150.

The accelerator 180 according to an embodiment may further include an overlay buffer 185.

The overlay buffer 185 may be a memory configured to store the overlay data Dr supplied from the host 150.

The overlay buffer 185 may be configured to supply the stored overlay data Dr to the rendering logic 183.

In the image display system 100 according to the first embodiment, the accelerator 180 may be separate from the host 150, the touch panel 110, the touch controller 120, the display panel 130, and the display controller 140.

For example, in an embodiment, the mask generating logic 181, the rendering logic 183, and the overlay buffer 185 may be implemented using different application specific integrated circuits (ASICs).

In other embodiments, the mask generating logic 181, the rendering logic 183, and the overlay buffer 185 may be implemented using a single ASIC.

In yet other embodiments, a field programmable gate array (FPGA) may be programmed to perform functions of the mask generating logic 181, the rendering logic 183, and the overlay buffer 185.

In an alternative embodiment, a general purpose processor may be programmed to perform functions of each of the mask generating logic 181, the rendering logic 183, and the overlay buffer 185 (e.g., with commands stored in the memory that is coupled to the general purpose processor).

Figure 5:
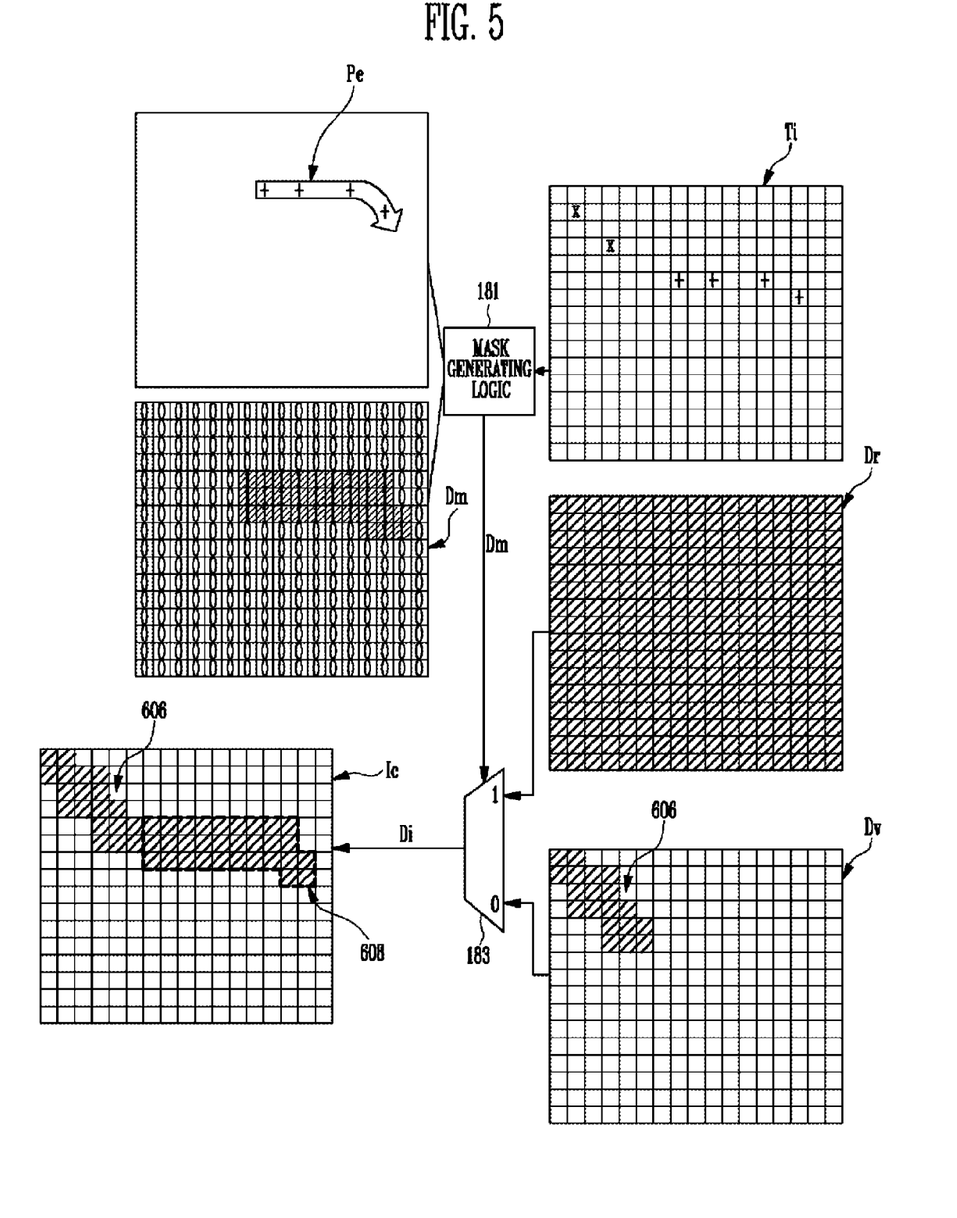
FIGS. 5 and 6 illustrate an operation of an accelerator according to an embodiment.
Figure 6:
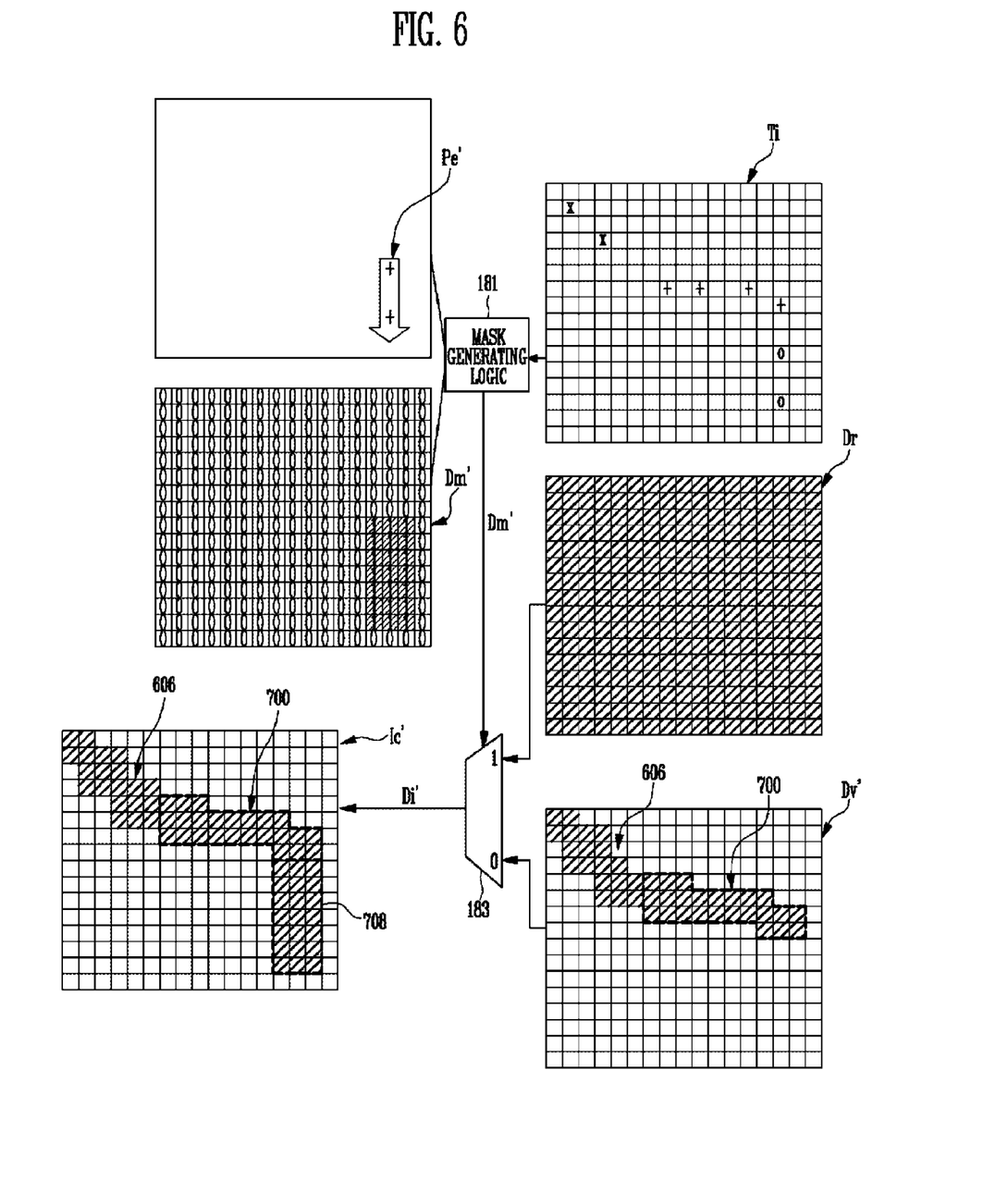

FIGS. 5 and 6 illustrate an operation of an accelerator according to an embodiment. Particularly, FIGS. 5 and 6 describe operations of the accelerator 180. The accelerator 180 is configured to generate the output image data Di by combining the video image data Dv and the overlay data Dr.

Referring to FIG. 5, the operations of the accelerator 180 according to an embodiment will be described.

When a touch event by the user occurs in an image display system 100, a touch controller 120 may compute the touch event information Ti corresponding to the touch event using a touch signal Ts supplied from a touch panel 110.

For example, when the user draws a certain pattern, the certain pattern may be recognized as a combination of a plurality of touch events by the touch controller.

That is, as shown in FIG. 5, the touch controller 120 may recognize the drawing operations of the user as touch events for six points.

For example, when the user draws a predetermined line during a k-th period and a (k+1)-th period, the touch events may be divided into the touch event occurring during the k-th period (shown as X in FIG. 5) and the touch event occurring during the (k+1)-th period.

The touch controller 120 may generate the touch event information Ti (e.g., positions or coordinates) corresponding to the plurality of touch events and supply the generated touch event information Ti to the mask generating logic 181.

The touch event information Ti may be divided into the touch event X occurring during the k-th period and the corresponding first touch event information, and the touch event+occurring during the (k+1)-th period and the corresponding second touch event information.

The touch controller 120 may supply the generated touch event information Ti to the accelerator 180 and the host 150.

The host 150 may generate video image data Dv for displaying an image segment 606 corresponding to the touch event X occurring during the k-th period, by using the first touch event information corresponding to the touch event X occurring during the k-th period.

The video image data Dv for displaying the image segment 606 may be supplied to the rendering logic 183 by the host 150.

The mask generating logic 181 may generate the estimated touch path Pe using the touch event information Ti supplied from the touch controller 120.

For example, the mask generating logic 181 may generate the estimated touch path Pe as shown in FIG. 5 by interpolating and/or extrapolating the second touch event information corresponding to the touch event+occurring during the (k+1)-th period.

The mask generating logic 181 may use the estimated touch path Pe to re-generate the mask data Dm.

For example, the mask generating logic 181 may generate the mask data Dm to reflect the generated estimated touch path Pe.

The mask data Dm may be configured to include a plurality of values. For example, the mask data Dm may have a matrix shape including a plurality of values.

Positions of the values included in the mask data Dm may correspond to positions of pixels in the display panel 130.

For example, the mask data Dm may include a two dimensional matrix corresponding to a two dimensional map of pixel positions in the combined output images Ic.

Each of the values of the mask data Dm may be expressed as single bits, and positions of the values in the mask data Dm may correspond to positions in the combined output images Ic.

For example, in the combined output images Ic, the positions that show the overlay data Dr may have values set to a first value (e.g., "1"), and the positions that do not show the overlay data Dr (e.g., positions where the video image data Dv are shown) may have values set to a second value (e.g., "0") different from the first value.

According to another embodiment, each of the values of the mask data Dm may be expressed as a plurality of bits (e.g., 8 bits). Here, the value of the mask data Dm may refer to "transparency" of the overlay data Dr at each location in the images.

As used herein, the term "transparency" may mean that the combined output images Ic include all the characteristics of both the overlay data Dr and the video image data Dv, by blending the overlay data Dr and the video image data Dv.

The parameter Pa supplied to the mask generating logic 181 may control characteristics of the estimated touch path Pe when the estimated touch path Pe is formed.

The parameter Pa may have a start-up default but may be adjusted depending on the need during run-time by software or other means.

The parameter Pa may be supplied from the host 150, and more particularly, from the CPU 151 included in the host 150.

The parameter Pa may control a width, a style, a shape, etc. of the generated estimated touch path Pe and a region in which the estimated touch path Pe is allowed (e.g., active drawing region). However, the parameter Pa is not limited thereto and may also control other characteristics in addition to the width, the style and the shape of the estimated touch path Pe.

For example, in some other embodiments, the parameter Pa may be set to limit the estimated touch path Pe to portions of the display panel 130 corresponding to the active drawing region.

In other embodiments, the parameter Pa may control the width of the line being drawn.

The mask generating logic 181 may use the parameter Pa along with pressure data included in the touch event information Ti to render the shape of the line to the mask data Dm in advance of a generated image segment 700 generated by the host 150.

When each pixel of the output image data Di is processed by the rendering logic 183, the rendering logic 183 may search for the value at a position (e.g., position in the matrix) in the mask data Dm corresponding to a position of the pixel.

To achieve desired visual effects (e.g., transparency and/or anti-aliasing), the rendering logic 183 may blend pixels of the video image data Dv and the overlay data Dr according to the value in the mask data Dm, or substitute the pixels of the video image data Dv with the overlay data Dr.

The rendering logic 183 may output the overlay data Dr or the video image data Dv to the display panel 130 or output the blended overlay data Dr and the video image data Dv to the display controller 140.

In other words, the rendering logic 183 may combine (blend or substitute) the video image data Dv and the overlay data Dr according to the mask data Dm and output the image data Di.

The generated output image data Di may be supplied to the display panel 130 through the display controller 140. The display panel 130 may display the combined output images Ic.

For example, rendering operations of the rendering logic 183 may be controlled by values at the mask data Dm that are defined as single bits.

That is, the rendering operations may determine output data with respect to each pixel based on the value in the mask data Dm corresponding to the positions of the pixels located in the output image data Di.

In an embodiment, the number (or size) of the values included in the mask data Dm may be equal to the number of pixels included in the video frame data Dv of one frame, which may be equal to the number of pixels included in the combined output image Ic (or the number of pixels included in the output image data Di).

There may be a one-to-one relationship between each of the values of the mask data Dm and each of the pixels of the video image data Dv.

Each of the values of the mask data Dm may correspond to each of the pixels in the output image data Di.

That is, in an embodiment of the rendering logic 183, each of the values of the mask data Dm is mated to the corresponding pixel in the video image data Dv. The pixel of the video image data Dv or the overlay data Dr may be output to the display controller 140.

For example, in an embodiment, the operations of the rendering logic 183 may be repeated through each of the values of the mask data Dm.

If the value of "0" exists at a certain position in the mask data Dm, the rendering logic 183 may output a pixel corresponding to the value of "0" among the video image data Dv.

If a value of "1" exists at a certain position in the mask data Dm, the rendering logic 183 may output the overlay data Dr.

As a result of the above repeated process, the rendering logic 183 may supply the output image data Di to the display controller 140, and the display panel 130 may display the combined output images Ic corresponding to the output image data Di.

The combined output images Ic is an image segment 606 corresponding to the touch event X occurring during the k-th period that is combined with an overlay image segment 608 corresponding to the touch event+occurring during the (k+1)-th period. The combined output images Ic may be displayed on the display panel 130.

In the case of the overlay image segment 608, since it is not processed through the host 150 (e.g., CPU 151 and GPU 153), it may be more rapidly displayed on the display panel 130.

In another embodiment, the number of values included in the mask data Dm may be smaller than the number of pixels included in the video image data Dv of one frame.

There may be a one-to-many relationship between each of the values of the mask data Dm and each of the pixels of the video image data Dv.

Each of the values of the mask data Dm may correspond to at least one pixel in the output image data Di.

Therefore, a certain value of the mask data Dm may correspond to a plurality of pixels included in the video image data Dv. As a result, the size of the mask data Dm may be decreased, and memory requirements of a buffer in which the mask data Dm is stored may be reduced.

However, the embodiments are not limited thereto. For example, in an alternative embodiment, the rendering operations of the rendering logic 183 may be controlled by the values of the mask data Dm that are defined as multi bits.

For example, the values of the mask data Dm may identify a blended level (e.g., a level of transparency) which is rendered by the rendering logic 183.

In another embodiment, when a plurality of rendering operations are supported by the rendering logic 183, at least one bit of the values included in the mask data Dm may be used in defining desired rendering operations, and other bits may be used in adjusting specifications of the rendering operations.

The rendering logic 183 may perform various rendering operations such as edge-enhance, dodge (brightening), burn (darkening), etc. using the video image data Dv and the overlay data Dr.

In other embodiments, the rendering operations may produce transparent coloring (or highlighter) effects or alpha compositing effects by changing color or luminosity of portions of the video image data Dv.

In an embodiment, the rendering logic 183 may receive two inputs.

For example, a first input may include the video image data Dv supplied from the host 150, and a second input may include the overlay data Dr supplied from the overlay buffer 185.

The overlay buffer 185 may store the overlay data Dr processed by the rendering logic 183.

The overlay data Dr may be supplied from the host 150 or internally generated at the accelerator 180.

The overlay data Dr characteristics may be mated to the video image data Dr characteristics. As a result, when they are rendered according to the mask data Dm, the combined output image Ic may implement continuous change between the image segment 606 and the overlay image segment 608.

The characteristics may include color.

For example, when the application software draws a black line, the overlay data Dr may be provided by the host 150 or internally generated by the accelerator 180 to include a black color that is the same as the color of the line drawn by the software (e.g., a bitmapped image having all of its pixels black).

The rendering logic 183 may generate the output image data Di by combining the overlay data Dr and the video image data Dv according to the mask data Dm. As the output image data Di is supplied to the display controller 140, the combined output images Ic may be displayed on the display panel 130.

The combined output images Ic may include a black line which is formed as the image segment 606 (e.g., the line drawn by the software) and the overlay image segment 608 from the host 150 are placed adjacent to each other.

The overlay data Dr may be texturized or colorized. The overlay data Dr may include bitmapped image data.

The content of the overlay data Dr may be dynamic with respect to time and may be updated by the host 150 or updated by the accelerator 180. The content of the overlay data Dr may be dynamic with respect to size and shape.

In an embodiment, the overlay data Dr may include a plurality of different "pages" expressing a plurality of overlay images.

For example, the plurality of pages may have different colors, images, or texture.

The values included in the mask data Dm may include information which can enable the rendering logic 183 to identify certain page(s) of the overlay data Dr and use only the identified page(s) during the rendering operation.

The values included in the mask data Dm may include indexes with respect to pages of the overlay data Dr which can enable the rendering logic 183 to change between different pages of the overlay data Dr during the rendering operations.

In an embodiment, the number of the values included in each page of the overlay data Dr may be equal to the number of pixels included in the video image data Dv of one frame, which may be equal to the number (or the number of pixels included in the output image data Di) of the pixels included in the combined output images Ic.

Therefore, there may be a one-to-one relationship between the values included in each page of the overlay data Dr and the pixels included in the video image data Dv.

In another embodiment, the number (or size) of the values included in each page of the overlay data Dr may be smaller than the number of pixels included in the video image data Dv of one frame.

Therefore, there may be a one-to-many relationship between the values included in each page of the overlay data Dr and the pixels included in the video image data Dv.

Since a certain value of the overlay data Dr corresponds to a plurality of pixels included in the video image data Dv, the size of the overlay data Dr may be decreased and the memory requirements of the overlay buffer 185 may be reduced.

For example, in some embodiments, the overlay data Dr may include a single color value that is the same as the red, green, and blue (RGB) color values. Here, the entire overlay image (or overlay image segment 608) may be drawn with the single color value.

In other embodiments, different pages of the overlay data Dr may be configured with single values which correspond to the single colors (e.g., different colors).

In yet other embodiments, the single values may be intermingled with other pages that include bitmapped images.

Referring to FIG. 6, operations of the accelerator 180 according to another embodiment will be explained. In particular, FIG. 6 illustrates a touch event that occurs during a (k+2)-th period after the (k+1)-th period.

For example, the touch event occurring during the k-th period is displayed as "X", the touch event occurring during the (k+1)-th period is displayed as "+", and the touch event occurring during the (k+2)-th period is displayed as "o".

The touch controller 120 may generate touch event information Ti (e.g., positions or coordinates) corresponding to touch events and supply the generated touch event information Ti to the mask generating logic 181.

The touch event information Ti may be divided into first touch event information corresponding to the touch event+ occurring during the (k+1)-th period and second touch event information corresponding to the touch event o occurring during the (k+2)-th period.

The touch controller 120 may supply the generated touch event information Ti to the accelerator 180 and the host 150.

The host 150 may generate video image data Dv' for additionally displaying the image segment 700 corresponding to the touch event+occurring during the (k+1)-th period, by using the first touch event information corresponding to the touch event+occurring during the (k+1)-th period.

For example, the host 150 may generate the video image data Dv' that includes the image segment 606 shown in FIG. 5 together with a new image segment 700.

The generated video image data Dv' may be supplied to the rendering logic 183 by the host 150.

The mask generating logic 181 may generate an estimated touch path Pe' different from the estimated touch path Pe shown in FIG. 5, by using the touch event information Ti supplied from the touch controller 120.

For example, the mask generating logic 181 may generate the estimated touch path Pe' such as the one shown in FIG. 6, by interpolating and/or extrapolating the second touch event information corresponding to the touch event o occurring during the (k+2)-th period.

The estimated touch path Pe' may be used to re-generate new mask data Dm' by the mask generating logic 181.

For example, the mask generating logic 181 may generate the mask data Dm' that is different from the mask data Dm shown in FIG. 5, by reflecting the generated estimated touch path Pe'.

The rendering logic 183 may generate output image data Di' by combining (blending or substituting) video image data Dv' and the overlay data Dr updated according to the mask data Dm'.

The overlay image segment 608 previously displayed may be replaced by the image segment 700 (which has a higher degree of precision) processed by the host 150, and the overlay image segment 708 corresponding to the touch event o occurring during the (k+2)-th period may be displayed on the display panel 130.

That is, updated output images Ic' may include an image segment 606 corresponding to the touch event X occurring during the k-th period, an image segment 700 corresponding to the touch event+occurring during the (k+1)-th period, and an overlay image segment 708 corresponding to the touch event o occurring during the (k+2)-th period.

Figure 7:
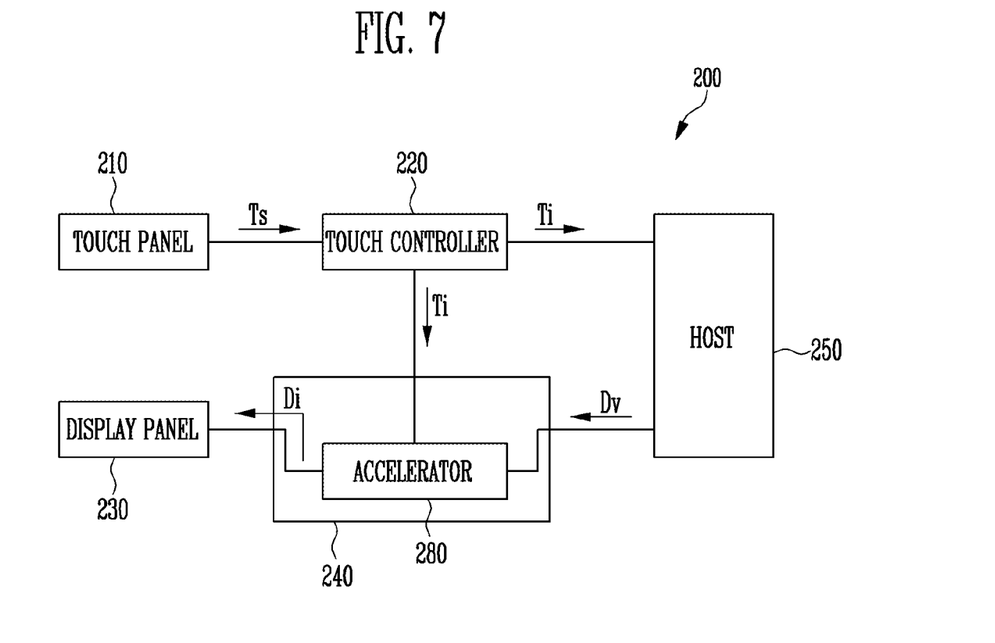
FIG. 7 illustrates an image display system according to a second embodiment.

FIG. 7 illustrates an image display system according to a second embodiment.

Referring to FIG. 7, the image display system 200 according to a second embodiment may include a touch panel 210, a touch controller 220, a display panel 230, a display controller 240, a host 250, and an accelerator 280.

In the image display system 200 according to the second embodiment, unlike the first embodiment, the accelerator 280 may be included in the display controller 240.

That is, the accelerator 280 may be integrated with the display controller 240 into one component.

For example, the accelerator 280 and the display controller 240 may be implemented as one integrated circuit.

A repeated description of the touch panel 210, the touch controller 220, the display panel 230, the display controller 240, the host 250, and the accelerator 280 included in the image display system 200 according to the second embodiment is omitted since the above elements are similar to those in the previously-described embodiments.

Figure 8:
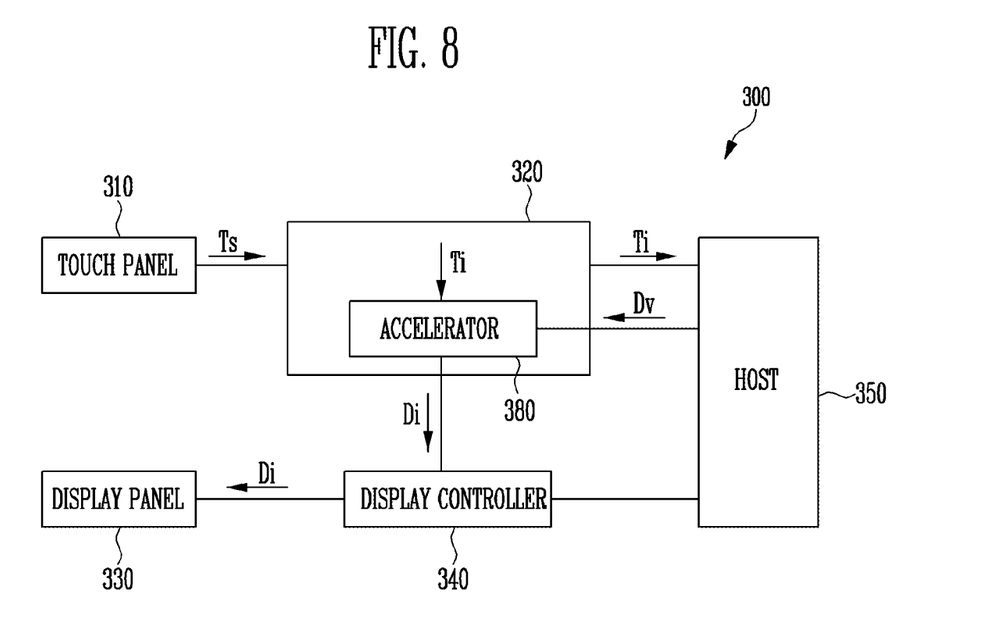
FIG. 8 illustrates an image display system according to a third embodiment.

FIG. 8 illustrates an image display system according to a third embodiment.

Referring to FIG. 8, an image display system 300 according to a third embodiment may include a touch panel 310, a touch controller 320, a display panel 330, a display controller 340, a host 350, and an accelerator 380.

In the image display system 300 according to the third embodiment, unlike the above-described embodiments, the accelerator 380 may be included in the touch controller 320.

That is, the accelerator 380 may be integrated with the touch controller 320 into one component.

For example, the accelerator 380 and the touch controller 320 may be implemented as one integrated circuit.

A repeated description on the touch panel 310, the touch controller 320, the display panel 330, the display controller 340, the host 350, and the accelerator 380 included in the image display system 300 according to the third embodiment is omitted since the above elements are similar to those in the previously-described embodiments.

Figure 9:
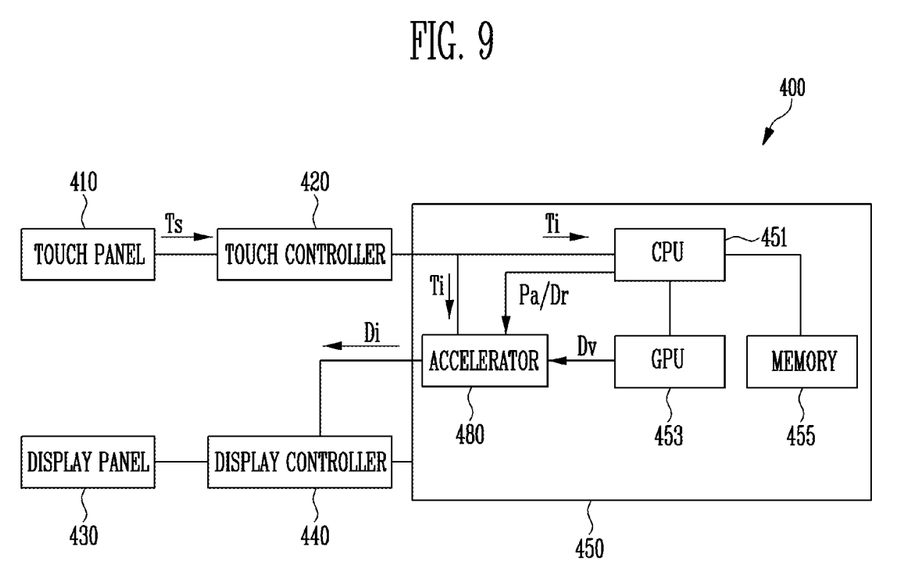
FIG. 9 illustrates an image display system according to a fourth embodiment.

FIG. 9 illustrates an image display system according to a fourth embodiment.

Referring to FIG. 9, the image display system 400 according to a fourth embodiment may include a touch panel 410, a touch controller 420, a display panel 430, a display controller 440, a host 450, and an accelerator 480.

In the image display system 400 according to the fourth embodiment, unlike the previously-described embodiments, the accelerator 480 may be included in the host 450.

That is, the accelerator 480 may be integrated with the host 450 into one component.

The accelerator 480 may preferably be implemented such that it is separate from other components included in the host 450 (e.g., a CPU 451, a GPU 453, and a memory 455).

Accordingly, when a touch event occurs, the display response time may be reduced because a display response corresponding to the touch event may be processed separately through the accelerator 480 without using the CPU 451 and the GPU 453 included in the host 450.

For example, the accelerator 480 and the host 450 may be implemented as one integrated circuit.

A repeated description of the touch panel 410, the touch controller 420, the display panel 430, the display controller 440, the host 450, and the accelerator 480 included in the image display system 400 according to the fourth embodiment is omitted since the above elements are similar to those in the previously-described embodiments.

Figure 10:
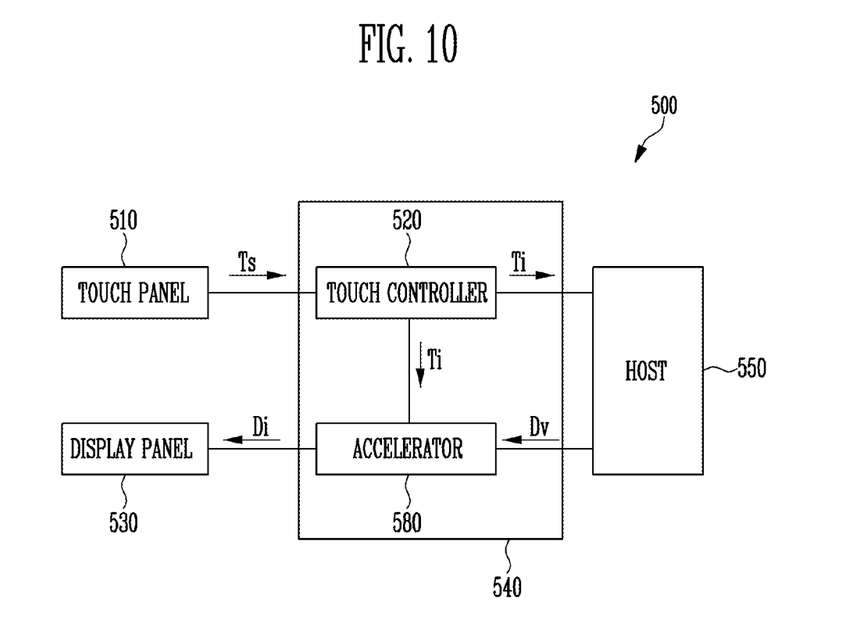
FIG. 10 illustrates an image display system according to a fifth embodiment.

FIG. 10 illustrates an image display system according to a fifth embodiment.

Referring to FIG. 10, the image display system 500 according to the fifth embodiment may include a touch panel 510, a touch controller 520, a display panel 530, a display controller 540, a host 550, and an accelerator 580.

In the image display system 500 according to the fifth embodiment, unlike the previously-described embodiments, the accelerator 580 and the touch controller 520 may be included in the display controller 540.

That is, the accelerator 580 may be integrated with the display controller 540 into one component.

For example, the accelerator 580, the touch controller 520, and the display controller 540 may be implemented as one integrated circuit.

A repeated description of the touch panel 510, the touch controller 520, the display panel 530, the display controller 540, the host 550, and the accelerator 580 included in the image display system 500 according to the fifth embodiment is omitted since the above elements are similar to those in the previously-described embodiments.

According to the embodiments of the inventive concept, an image display system capable of reducing latency between a touch event and a display response corresponding to the touch event can be achieved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used alone or in combination with features, characteristics, and/or elements described in connection with other embodiments unless otherwise specifically indicated. Accordingly, it will be understood by those of skill in the art that various changes in form and details may be made without departing from the spirit and scope of the inventive concept as set forth in the following claims.

What is claimed is:

1. An image display system, comprising:
   a host configured to supply video image data to an accelerator;
   a touch controller configured to generate touch event information corresponding to a touch signal and supply the touch event information to the accelerator, wherein the touch signal is output from a touch panel;
   the accelerator configured to generate, based on the touch event information supplied from the touch controller, output image data corresponding to a touch event; and
   a display controller configured to supply the output image data generated by the accelerator to a display panel,
   wherein the accelerator comprises:
   a mask generating logic configured to receive the touch event information and generate mask data based on the touch event information; and
   a rendering logic configured to generate the output image data by combining the video image data and overlay data according to the mask data.

2. The image display system of claim 1, wherein the accelerator is separate from the host, the touch panel, the touch controller, the display panel, and the display controller.

3. The image display system of claim 1, wherein the accelerator is included in the display controller.

4. The image display system of claim 1, wherein the accelerator is included in the touch controller.

5. The image display system of claim 1, wherein the accelerator is included in the host.

6. The image display system of claim 1, wherein the touch controller and the accelerator are included in the display controller.

7. The image display system of claim 1, wherein the accelerator further comprises an overlay buffer configured to store the overlay data.

8. The image display system of claim 7, wherein the overlay buffer is configured to store the overlay data supplied from the host.

9. The image display system of claim 1, wherein the mask generating logic is configured to calculate an estimated touch path according to the touch event information and generate the mask data according to the estimated touch path.

10. The image display system of claim 1, wherein the mask data comprises a plurality of values having positions corresponding to pixels in the output image data.

11. The image display system of claim 10, wherein the rendering logic is configured to combine the video image data with the overlay data by determining, for each pixel in the output image data, whether to output a corresponding pixel of the video image data or the overlay data according to a value in a corresponding position in the mask data.

12. The image display system of claim 10, wherein the rendering logic is configured to combine the video image data with the overlay data by blending, for each pixel in the output image data, a corresponding pixel of the video image data and the overlay data according to a value in a corresponding position in the mask data.

13. The image display system of claim 10, wherein the values of the mask data correspond respectively to the pixels in the output image data.

14. The image display system of claim 10, wherein each of the values of the mask data corresponds to at least one pixel in the output image data.

15. The image display system of claim 1, wherein the touch panel is configured to supply the touch signal to the touch controller, wherein the touch controller is configured to generate the touch event information using the touch signal supplied from the touch panel.

16. The image display system of claim 15, wherein the touch panel includes a capacitive touch panel, a resistive touch panel, an optical touch panel, a surface acoustic wave touch panel, a pressure sensitive touch panel, or a hybrid touch panel.

17. The image display system of claim 1, wherein the host is configured to generate the video image data.

18. The image display system of claim 1, wherein the overlay data has a same color as the video image data.

19. The image display system of claim 1, wherein the overlay data comprises a plurality of pages.

20. The image display system of claim 19, wherein the mask data comprises information for identifying at least one of the plurality of pages included in the overlay data.

21. The image display system of claim 1, wherein the overlay data comprises a bitmapped image.

22. The image display system of claim 1, wherein the overlay data has a single color value.

23. The image display system of claim 1, wherein the touch event information comprises first touch event information corresponding to a touch event occurring during an n-th period and second touch event information corresponding to a touch event occurring during a (n+1)-th period.

24. The image display system of claim 23, wherein the touch controller is configured to supply the touch event information to the host.

25. The image display system of claim 24, wherein the mask generating logic is configured to generate the mask data based on the second touch event information, and wherein the host is configured to generate the video image data based on the first touch event information.

26. The image display system of claim 1, wherein the host comprises a central processing unit and a graphic processing unit.

27. The image display system of claim 26, wherein the central processing unit is configured to supply the overlay data to the accelerator, and wherein the graphic processing unit is configured to supply the video image data to the accelerator.

28. The image display system of claim 1, wherein the output image data is the overlay data combined with the video image data supplied from the host.

29. An image display system, comprising:
a host configured to generate video image data;
a touch controller configured to generate touch event information corresponding to a touch signal that is output from a touch panel, wherein the touch event information comprises first touch event information corresponding to a first touch event occurring during an n-th period and second touch event information corresponding to a second touch event occurring during a (n+1)-th period;
an accelerator configured to generate, based on the touch event information supplied from the touch controller, output image data corresponding to a touch event;
a display controller configured to supply the output image data generated by the accelerator to a display panel; and
the display panel configured to display an image corresponding to the output image data,
wherein the image rendered by the accelerator in the (n+1)-th period combines an image segment corresponding to the first touch event occurred during the n-th period and an overlay image segment corresponding to the second touch event occurring during the (n+1)-th period,
wherein the image rendered by the accelerator in an (n+2)-th period combines an updated image segment and an updated overlay image segment corresponding to a third touch event occurring during the (n+2)-th period, wherein the updated image segment comprises the image segment corresponding to the first touch event occurred during the n-th period and the overlay image segment corresponding to the second touch event occurred during the (n+1)-th period, and
wherein the overlay image segment corresponding to the second touch event occurred during the (n+1)-th period is replaced with the updated image segment received from the host during the (n+2)-th period.

* * * * *